United States Patent
Campos et al.

(10) Patent No.: US 9,721,204 B2
(45) Date of Patent: Aug. 1, 2017

(54) EVALUATION OF A SYSTEM INCLUDING SEPARABLE SUB-SYSTEMS OVER A MULTIDIMENSIONAL RANGE

(71) Applicant: QUALCOMM Incorporated, San Diego, CA (US)

(72) Inventors: Michael Campos, La Jolla, CA (US); Casimir Matthew Wierzynski, San Diego, CA (US); Bardia Fallah Behabadi, Pasadena, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 14/065,388

(22) Filed: Oct. 28, 2013

(65) Prior Publication Data
US 2015/0120632 A1    Apr. 30, 2015

(51) Int. Cl.
G06F 15/00 (2006.01)
G06F 17/00 (2006.01)
G06N 3/10 (2006.01)
G06N 3/08 (2006.01)
G06N 3/04 (2006.01)
G08B 17/00 (2006.01)

(52) U.S. Cl.
CPC .............. *G06N 3/082* (2013.01); *G06N 3/049* (2013.01); *G06N 3/04* (2013.01); *G06N 3/10* (2013.01); *G06N 3/105* (2013.01); *G08B 17/005* (2013.01)

(58) Field of Classification Search
None
See application file for complete search history.

(56) References Cited

U.S. PATENT DOCUMENTS

| | | | |
|---|---|---|---|
| 5,317,676 A | 5/1994 | Austvold et al. | |
| 5,924,086 A | 7/1999 | Mathur et al. | |
| 7,502,763 B2 | 3/2009 | Ayala et al. | |
| 8,065,244 B2 | 11/2011 | Chen et al. | |
| 2006/0224533 A1 | 10/2006 | Thaler | |
| 2012/0166374 A1* | 6/2012 | Moussa ................... G06N 3/02 706/16 |

OTHER PUBLICATIONS

Serialization Sets: A Dynamic Dependence-Based Parallel Execution Model Matthew D. Allen Srinath Sridharan Gurindar S. Sohi Computer Sciences Department University of Wisconsin-Madison {matthew, sridhara, sohi}@cs.wisc.edu—2009.*

(Continued)

*Primary Examiner* — Kakali Chaki
*Assistant Examiner* — Ababacar Seck
(74) *Attorney, Agent, or Firm* — Seyfarth Shaw LLP

(57) ABSTRACT

An artificial neural network may be configured to test the impact of certain input parameters. To improve testing efficiency and to avoid test runs that may not alter system performance, the effect of input parameters on neurons or groups of neurons may be determined to classify the neurons into groups based on the impact of certain parameters on those groups. Groups may be ordered serially and/or in parallel based on the interconnected nature of the groups and whether the output of neurons in one group may affect the operation of another. Parameters not affecting group performance may be pruned as inputs to that particular group prior to running system tests, thereby conserving processing resources during testing.

24 Claims, 15 Drawing Sheets

(56) References Cited

OTHER PUBLICATIONS

Neural Network Dimension Selection for Dynamical System Identification Devin Sabo, Xiao-Hua Yu 17th IEEE International Conference on Control Applications Part of 2008 IEEE Multi-conference on Systems and Control San Antonio, Texas, USA, Sep. 3-5, 2008.*
Cluster Computing: High-Performance, High-Availability, and High-Throughput Processing on a Network of Computers Chee Shin Yeo1, Rajkumar Buyya1, Hossein Pourreza2, Rasit Eskicioglu2, Peter Graham2, Frank Sommers3—2006.*
Serialization Sets: A Dynamic Dependence-Based Parallel Execution Model—2009 Matthew D. Allen Srinath Sridharan Gurindar S. Sohi.*
Cluster Computing: High-Performance, High-Availability, and High-Throughput Processing on a Network of Computers 2006 Chee Shin Yeo1, Rajkumar Buyya1, Hossein Pourreza2, Rasit Eskicioglu2, Peter Graham2, Frank Sommers3.*
Neural Network Dimension Selection for Dynamical System Identification—2008 Devin Sabo, Xiao-Hua Yu.*
A New Feedforward Neural Network Hidden Layer Neuron Pruning Algorithm 2001 F. Fnaiech* Member IEEE—N. Fnaiech*—M. Najim** : Fellow IEEE.*
Cluster Computing: High-Performance, High-Availability, and High-Throughput Processing on a Network of Computers 2006 Chee Shin Yeo1, Rajkumar Buyya1, Hossein Pourreza2, Rasit Eskicioglu2, Peter Graham2, Frank Sommers3.*
Neural Network Pruning and Pruning Parameters—1996 G. Thimm and E. Fiesler.*
Abramson D., et al., "Parameter Space Exploration Using Scientific Workflows," Computational Science—ICCS, 2009, vol. 5544, pp. 104-113, XP019129845.
Djurfeldt M., "The Connection-Set Algebra—A Novel Formalism for the Representation of Connectivity Structure in Neuronal Network Models," Neuroinformatics, 2012, vol. 10 (3), pp. 287-304, XP035072587.
International Search Report and Written Opinion—PCT/US2014/061220—ISAEPO—May 28, 2015.
Madani K., et al., "Tree-Like Multiple Neural Network Models Generator with a Complexity Estimation Based Decomposer," IEEE Intelligent Data and Acquisition Advanced Computing Systems: Technology and Applications (IDAACS), 2005, pp. 60-65, XP031009281.
Nageswaran J.M., et al., "Towards Reverse Engineering the Brain: Modeling Abstractions and Simulation Frameworks," 18th IEEE/IFIP VLSI System on Chip Conference (VLSI-SoC), 2010, XP031806438.
Sheik S., et al., "Systematic Configuration and Automatic Tuning of Neuromorphic Systems," IEEE International Symposium on Circuits and Systems (ISCAS), 2011, pp. 873-876, XP031997770.
Wendt K., et al., "Abbildung Komplexer, Pulsierender, Neuronaler Netzwerke Auf Spezielle Neuronale VLSI Hardware," Dresdner Arbeitstagung Schaltungs- und Systementwurf (DASS), 2007, pp. 127-132, XP055186864.

\* cited by examiner

EVALUATION OF A SYSTEM INCLUDING SEPARABLE SUB-SYSTEMS OVER A MULTIDIMENSIONAL RANGE

BACKGROUND

Field

Certain aspects of the present disclosure generally relate to neural system engineering and, more particularly, to developing and testing of a neural network by improving the execution time of a parameter search.

Background

Artificial neural networks may provide innovative and useful computational techniques for certain applications in which traditional computational techniques are cumbersome, impractical, or inadequate. Artificial neural networks may have corresponding structure and/or function in biological neural networks. An artificial neural network, which may be an interconnected group of artificial neurons (i.e., neuron models), is a computational device or represents a method to be performed by a computational device. Because artificial neural networks can infer a function from observations, such networks are particularly useful in applications where the complexity of the task or data makes the design of the function by conventional techniques burdensome.

SUMMARY

In one aspect, a method of wireless communication is disclosed. The method includes serializing sub-systems of the system by determining the one-way dependencies between the sub-systems and/or parallelizing the sub-systems by determining independencies within each sub-system. The method further includes pruning input parameters of each sub-system based on whether each input parameter affects each sub-system.

Another aspect discloses an apparatus including means for serializing sub-systems of the system by determining the one-way dependencies between the sub-systems and/or means for parallelizing the sub-systems by determining independencies within each sub-system. The apparatus further includes means for pruning input parameters of each sub-system based on whether each input parameter affects each sub-system.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of serializing sub-systems of the system by determining the one-way dependencies between the sub-systems and/or parallelizing the sub-systems by determining independencies within each sub-system. The program code also causes the processor(s) to prune input parameters of each sub-system based on whether each input parameter affects each sub-system.

Another aspect discloses wireless communication having a memory and at least one processor coupled to the memory. The processor(s) is configured to serialize sub-systems of the system by determining the one-way dependencies between the sub-systems and/or parallelize the sub-systems by determining independencies within each sub-system. The processor(s) is also configured to prune input parameters of each sub-system based on whether each input parameter affects each sub-system.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
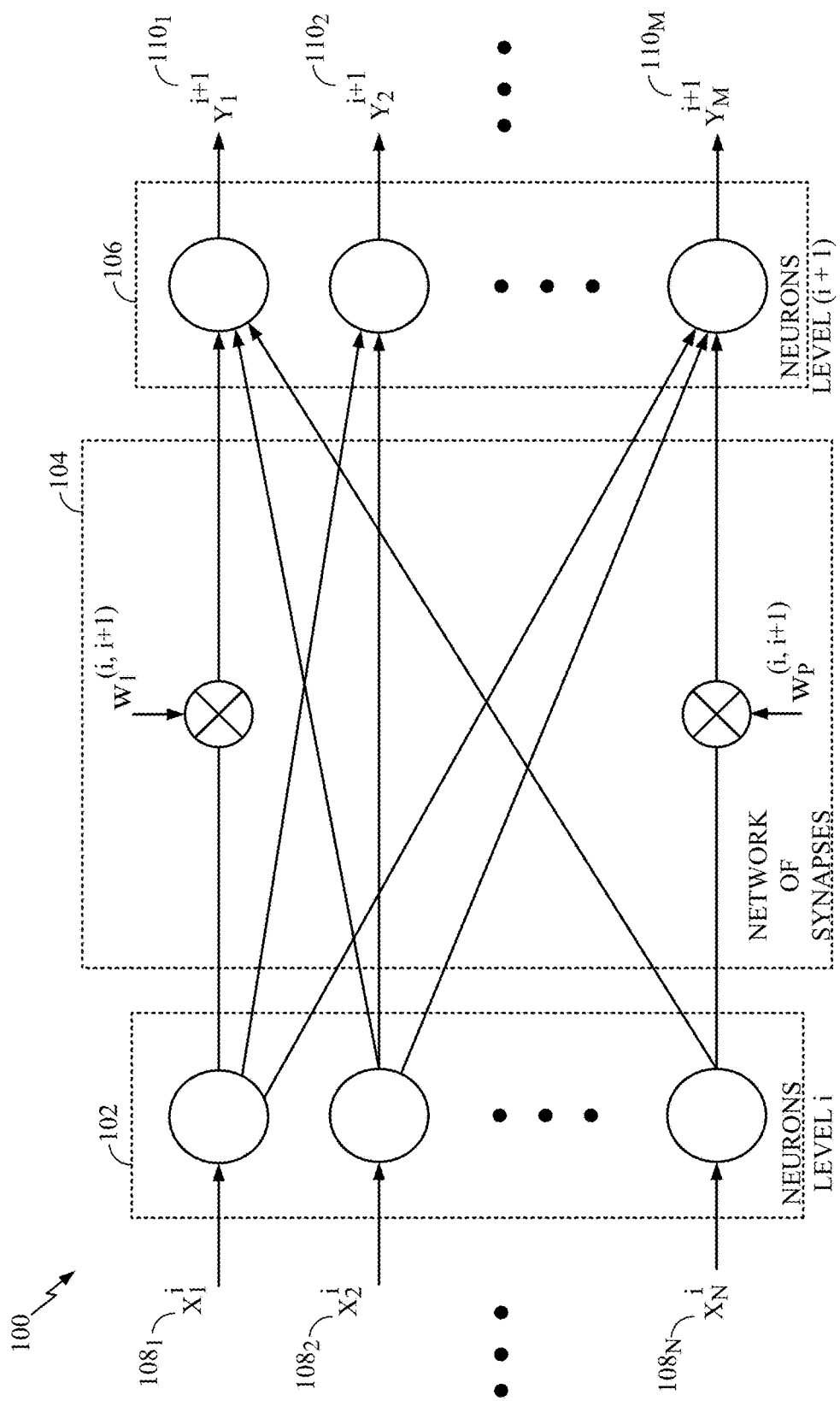
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). In some cases, the neuron may continuously transmit a signal to the next level of neurons. The transmitted signal may be a function of the membrane potential. Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered pre-synaptic neurons and neurons of level 106 may be considered post-synaptic neurons. The synapses 104 may receive output signals (i.e., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. For example, in the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
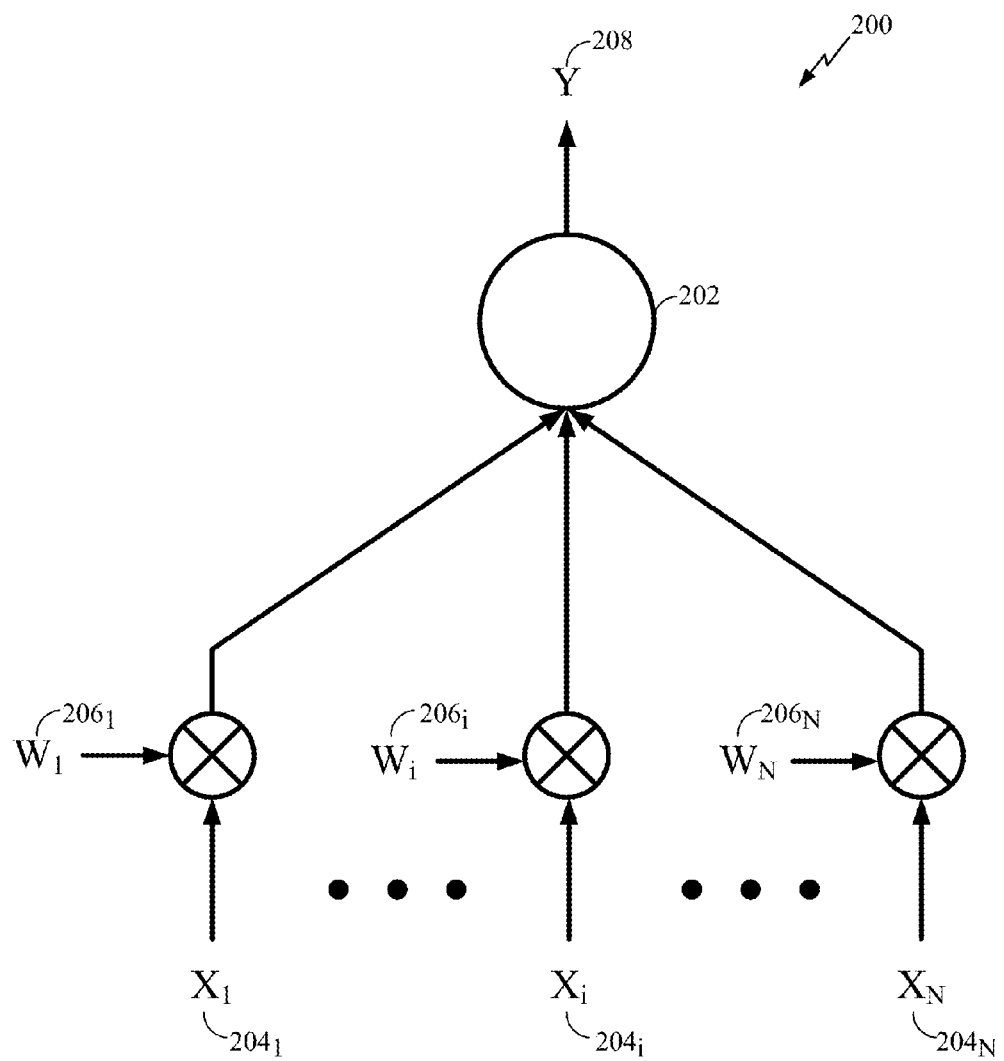
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($X_1 9_N$), which may be signals external to the neural system, or signals generated by other neurons of the same neural system, or both. The input signal may be a current, a conductance, a voltage, a real-valued, and/or a complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, a conductance, a voltage, a real-valued, and/or a complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}$, ..., $w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may include non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not execute plasticity functions (or wait for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type. Use of varying synapse types may add flexibility and configurability to an artificial neural network.

There are implications of spike-timing dependent structural plasticity being executed independently of synaptic plasticity. Structural plasticity may be executed even if there is no change to weight magnitude (e.g., if the weight has reached a minimum or maximum value, or it is not changed due to some other reason) because structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to an insignificant level.

Because a neuron generally produces an output spike when many of its inputs occur within a brief period, (i.e., inputs being sufficiently cumulative to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by:

$$\Delta w(t) = \begin{cases} a_+ e^{-t/k_+} + \mu, & t > 0 \\ a_- e^{t/k_-}, & t > 0 \end{cases} \quad (1)$$

where $k_+$ and $k_-\tau_{sign(\Delta t)}$ are time constants for positive and negative time difference, respectively, $\alpha_+$ and $\alpha_-$ are corresponding scaling magnitudes, and $\mu$ is an offset that may be applied to the positive time difference and/or the negative time difference.

Figure 3:
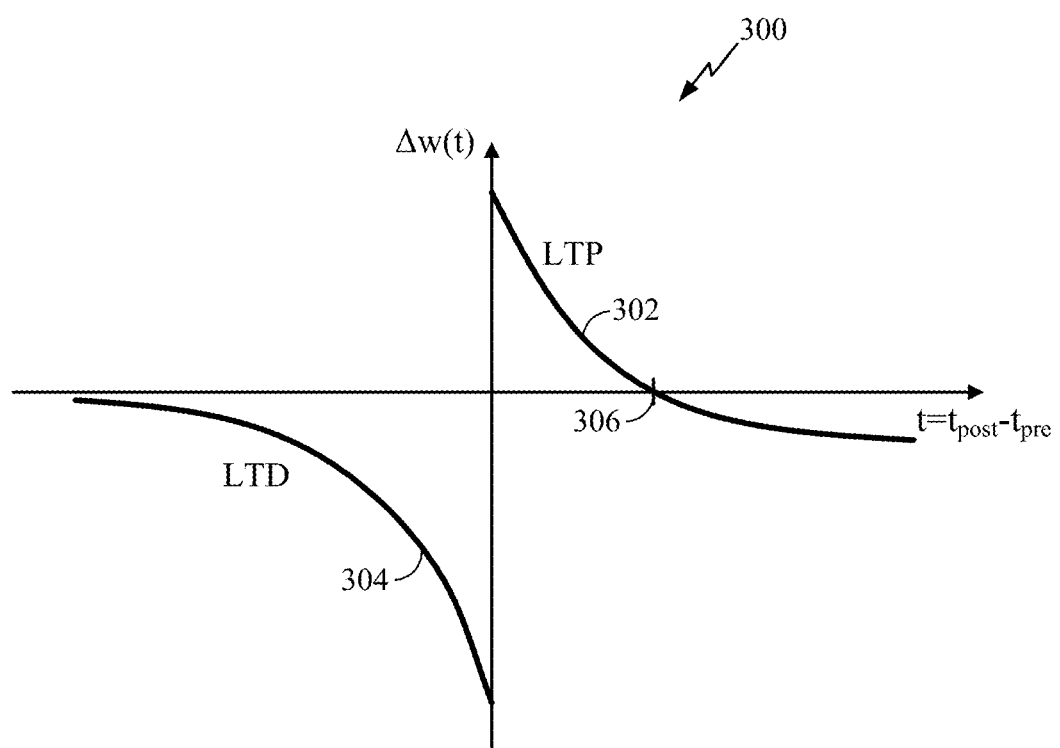
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of pre-synaptic and post-synaptic spikes in accordance with the STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration of spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding. For example, the arrival time of inputs affects output time and coincidence detection can have a narrow time window. Additionally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
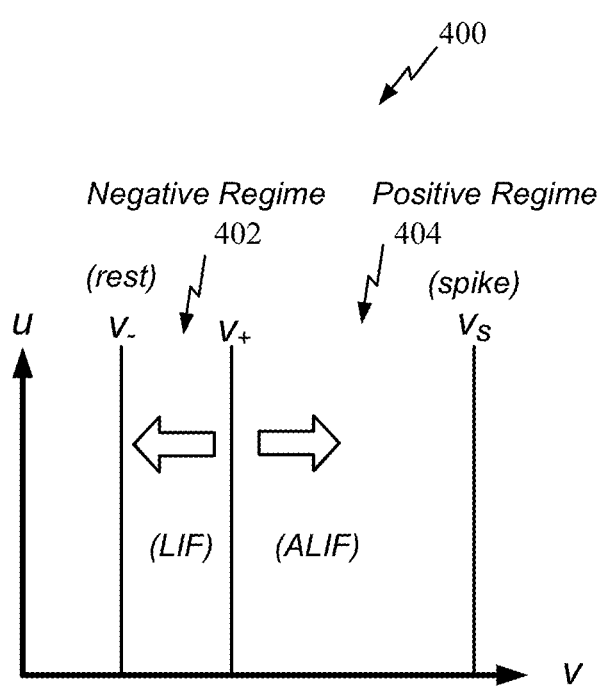
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime (which is different from the LIF neuron model)) and the positive regime 404 (also interchangeably referred to as the anti-leaky-integrate-and-fire (ALIF) regime, not to be confused with the ALIF neuron model)). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constants $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_S$. Subsequently, the state may be reset at a reset event (which may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are:

$$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r \quad (12)$$

Therefore, the model state may be updated only upon events, such as an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho} \quad (13)$$

If a spike is defined as occurring at the time the voltage state v reaches $v_S$, then the closed-form solution for the amount of time, or relative delay, until a spike occurs as measured from the time that the voltage is at a given state v is:

$$\Delta t_S = \begin{cases} \tau_+ \log \frac{v_S + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Parameter Evaluation

Development of neural network models may include specifications for evaluating various combinations of parameters. For example, during a design process, neural networks may be tested with various parameters to improve the design of the neural network. The parameters may include the weight of synapses, delays, neuron model parameters, parameters describing elements, such as a spike threshold and/or maximum conductance, parameters describing inputs, such as a number of images and/or audio files used, learning parameters, and/or other variables of the neural network. By setting the parameters to different values and performing testing with those different values, the neural networks may be evaluated based on various criteria, such as the efficiency of the neural network.

As an example, the parameters for an exemplary neural network may be set as parameters A-D. The neural network may use a function (F) to evaluate the parameters. For example, a function F(A,B,C,D), evaluates the parameters A-D where the parameters may be given any value, such as A=1, 2, . . . 10, etc. To evaluate the neural network, it is desirable to try as many combinations of the parameters as possible.

In a typical neural network, the parameter search suffers from combinatorial explosion. That is, the amount of time to evaluate a function, such as function (F), is equal to the product of the amount of time to evaluate all of the variables for a first parameter, such as parameter (A), the amount of time to evaluate all of the variables for a second parameter, such as parameter (B), and so forth. In this example, the equation for the evaluation time of the entire function (F) may be expressed as T(F)=T(A)*T(B)*T(C)*T(D), where T represents time. The parameter search may be referred to as a parameter sweep. Depending on the number of potential values for each parameter, T(F) may become very large.

Figure 5A:
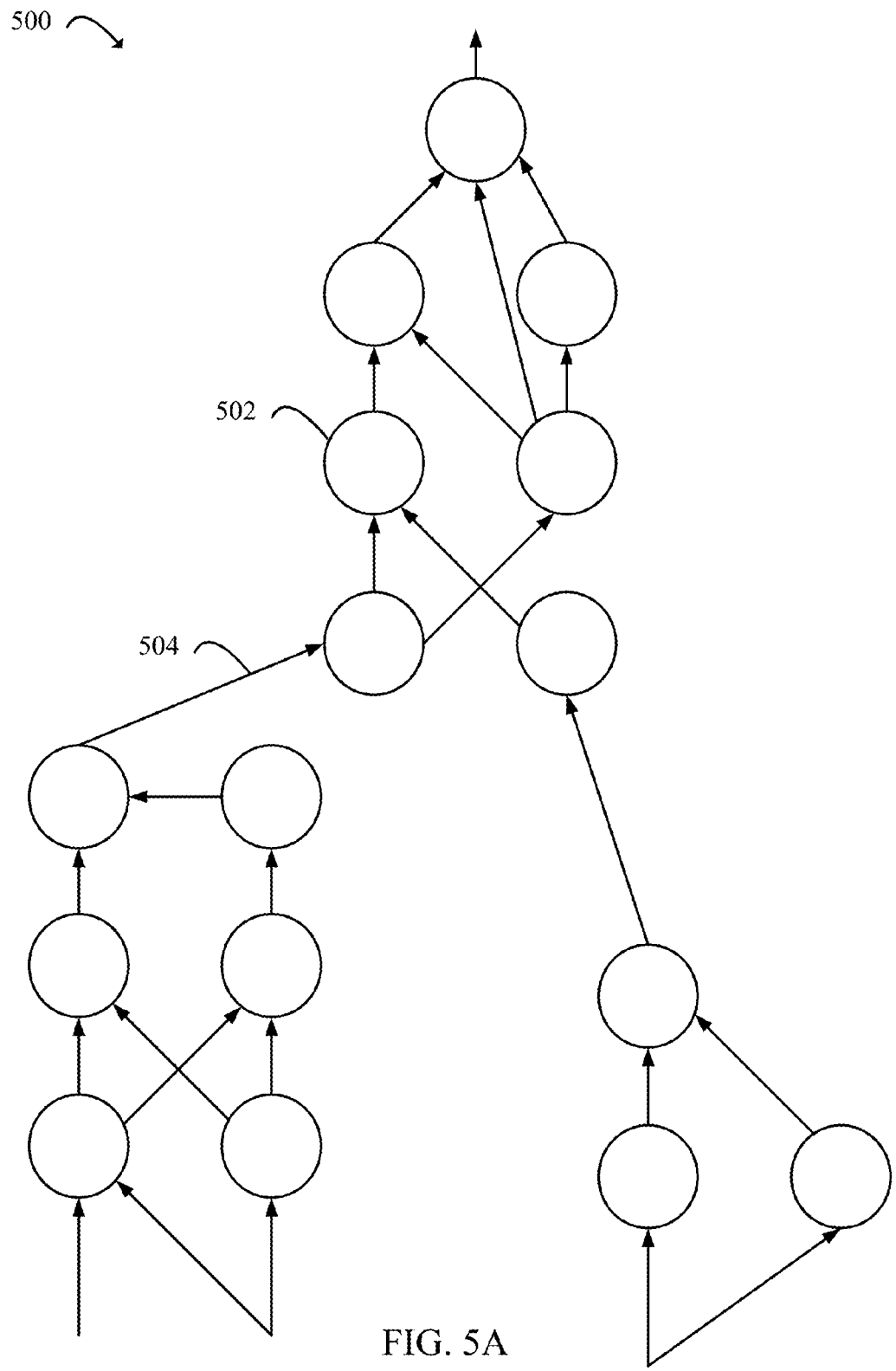
FIGS. 5A-5B illustrate examples of a neural network according to aspects of the present disclosure.

FIG. 5A illustrates an example of a neural network 500. As shown in FIG. 5A, the neural network may include multiple neurons 502 that are interconnected via synapses 504. In some cases, a first group of interconnected neurons may have a feed forward connection with a second group of interconnected neurons. That is, the second group of interconnected neurons has a one-way dependency with the first group of interconnected neurons. More specifically, the output of the first group of interconnected neurons affects the second group of interconnected neurons. Additionally, the output of the second group of interconnected neurons does not affect the first group of interconnected neurons. Thus, the first group of interconnected neurons may be designated as a first hidden sub-system of neurons and the second group of interconnected neurons may be a second hidden sub-system of neurons.

Figure 5B:
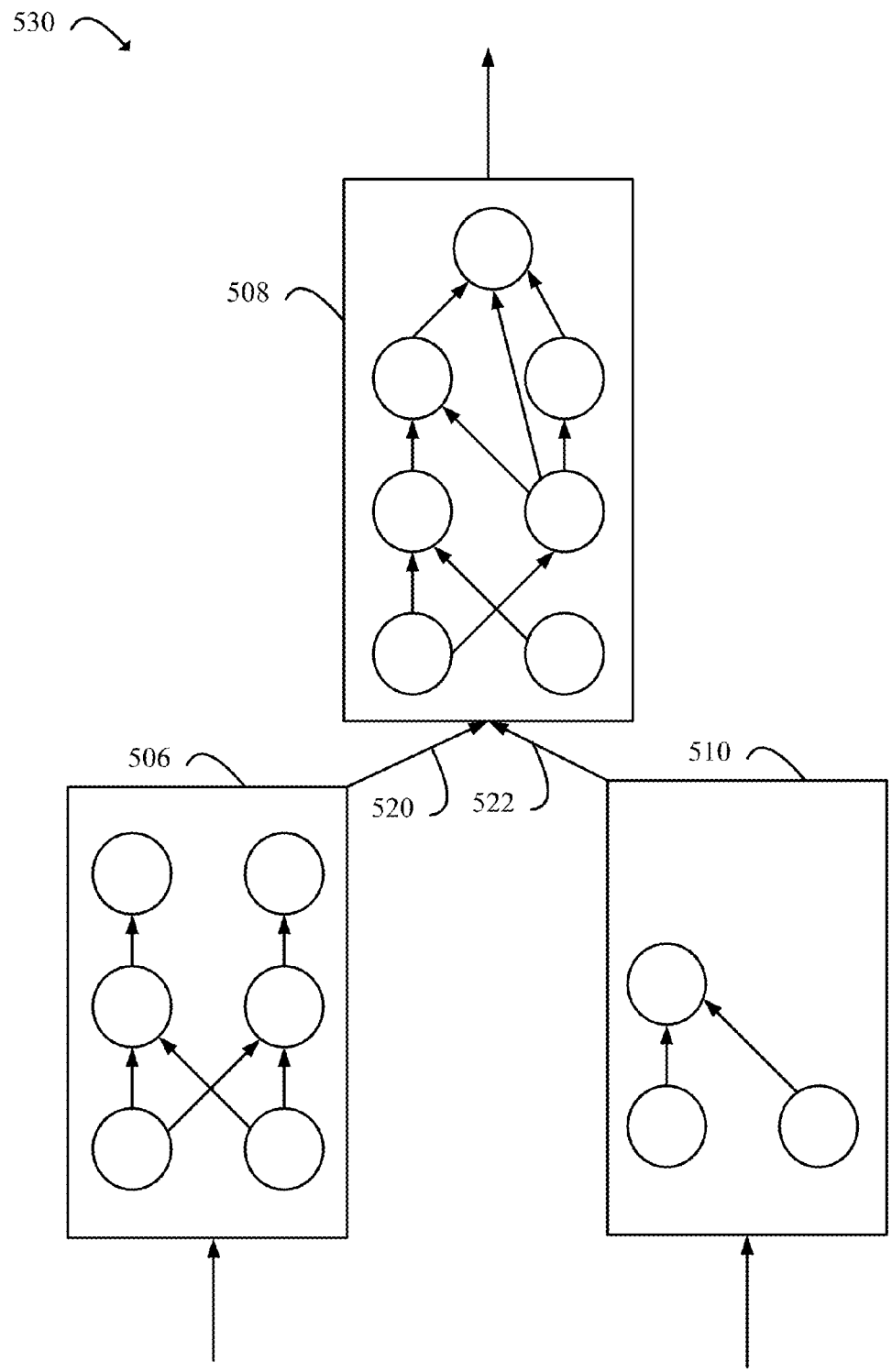

FIG. 5B illustrates an example neural network that has been compartmentalized into hidden sub-systems. Specifically, the neural network of FIG. 5A has been compartmentalized into hidden sub-systems to create the exemplary neural network 530 of FIG. 5B. Based on an aspect of the present disclosure, the neural network 530 may be analyzed to determine the hidden sub-systems 506, 508, 510 of the neural network 530.

The three hidden sub-systems 506, 508, 510 may be referred to as hidden sub-systems because the sub-systems are not readily determined to the developer of the neural network and/or the untrained eye. The sub-systems may be referred to as components or restricted sets. Although FIGS. 5A and 5B only illustrate one feed forward connection 520, 522 from each hidden sub-system 506, 510 to the second hidden sub-system 508, the present application is not limited to sub-systems only having one feed forward connection and is also contemplated for multiple feed forward connections.

Specifically, as shown in FIG. 5B, the interconnected neurons of the first hidden sub-system 506 have a feed forward connection 520 to the interconnected neurons of the second hidden sub-system 508. That is, the output of first hidden sub-system 506 affects the second hidden sub-system 508. Additionally, the interconnected neurons of the third hidden sub-system 510 have a feed forward connection 522 to the interconnected neurons of the second hidden sub-system 508. That is, the output of third hidden sub-system 510 affects the second hidden sub-system 508. Thus, the neural network 530 may be compartmentalized to the three hidden sub-systems 506, 508, 510 of interconnected neurons.

In the present example, each sub-system has two parameters of interest, A and B, with ten possible values (1 through 10). A single testing run to evaluate one sub-system with one of the possible values for one of the parameters may take one minute. Thus, it would take two years (i.e., $10^6$ runs) to evaluate all possible combinations for all of the parameters in the neural network 530. This is obviously impractical. Therefore, there is a need to decrease the time for evaluating all possible parameters of a neural network.

According to an aspect of the present disclosure, to improve the evaluation time for possible parameters of a neural network, as shown in FIG. 5B, the network may be segregated into functionally isolated sub-networks. In one configuration, the parameters of the sub-systems may be analyzed to determine the parameters that may be pruned (e.g., removed).

FIGS. 6A-6D illustrate block diagrams for segregating a neural network to functionally isolated sub-networks according to an aspect of the present disclosure.

Figure 6A:
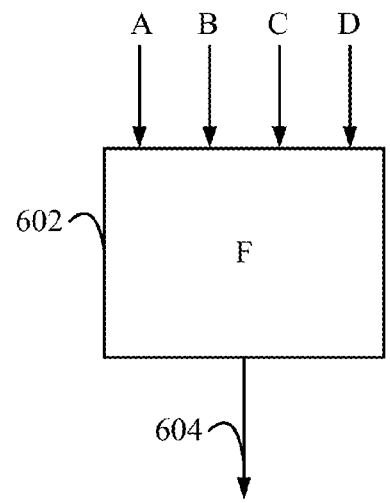
FIGS. 6A-6D illustrate examples of a neural network according to aspects of the present disclosure.
Figure 6B:
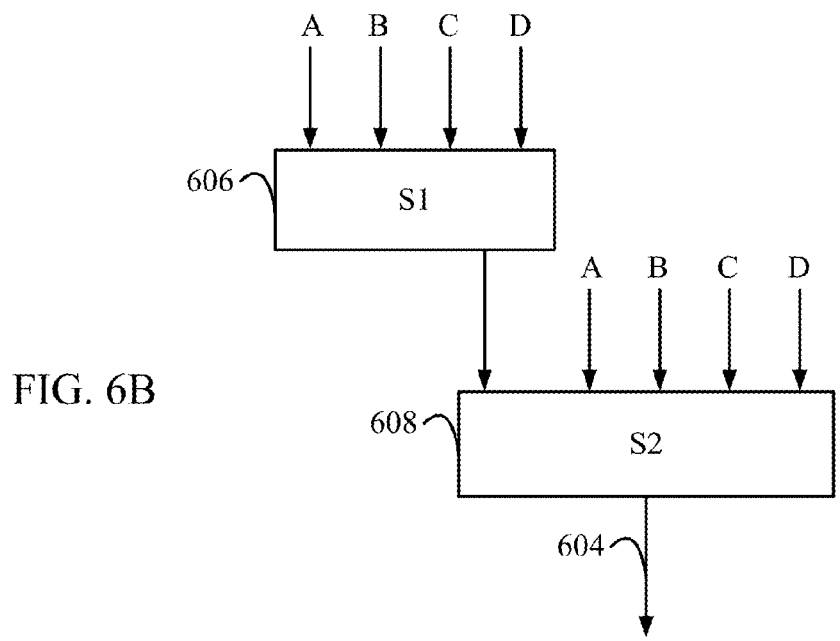

As shown in FIG. 6A, a neural network (F) 602 receives inputs for parameters A, B, C, and D. Furthermore, the neural network 602 may have an output 604. As shown in FIG. 6B, after identifying the neural network 602 and the parameter inputs A-D, the neural network 602 may be serialized to determine the layers of the neural network 602. The layers of the neural network are similar to the hidden sub-systems of FIG. 5B. The layers may include a first layer (e.g., input layer) and lower layers, such as a second layer, third layer, etc.

The first layer refers to a group of interconnected neurons that have no internal inputs and project to another group of interconnected neurons. In FIG. 6B, the first serialized layer (S1) 606 is a first group of interconnected neurons that have no internal inputs. The first serialized layer 606 may project to a second serialized layer (S2) 608 (e.g., lower layer). The lower layer refers to a second group of interconnected neurons that receives an input from a higher layer. That is, the second serialized layer 608 is a group of interconnected neurons that receives an input from the first serialized layer 606. Furthermore, the second serialized layer 608 does not input into the first serialized layer 606. A neural network, such as the neural network 602 of FIG. 6 may have many serialized layers. In this example, only two serialized layers 606 and 608 are illustrated.

Figure 6C:
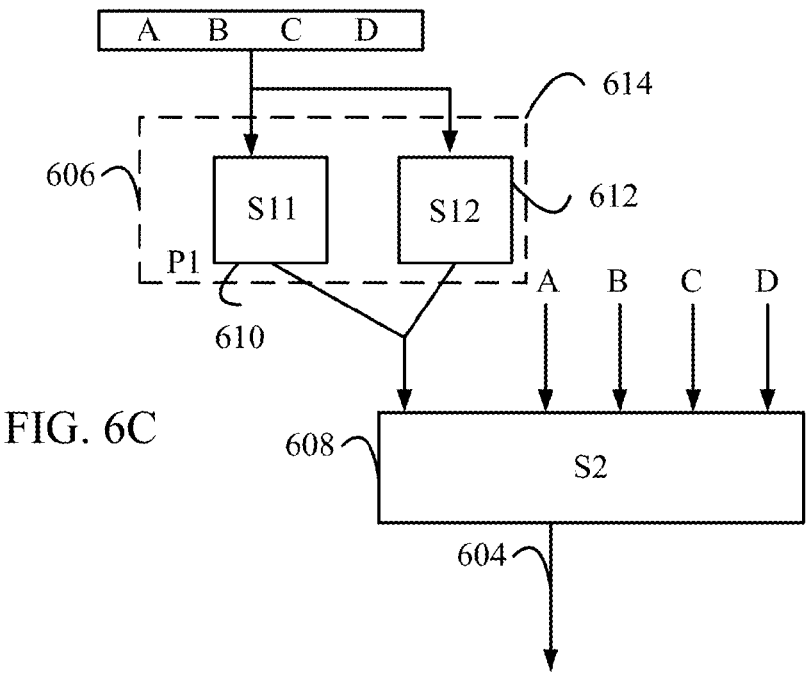

As shown in FIG. 6C, after serializing the layers, each serialized layer 606, 608 may be parallelized. That is, using reciprocal connections, groups or islands of neurons may be determined in each serialized layer. Specifically, for parallelization the interdependencies of a layer, or serialized layer, are determined. Based upon these interdependencies, neurons may be grouped into parallelized clusters where the output of one parallelized cluster is independent from the output of another parallelized cluster. In this manner, neurons may be grouped into parallel clusters within a serialized layer. Neurons may also be grouped into parallelized clusters without serialization of the layers.

For example, as shown in FIG. 6C, the first serialized layer 606 may be parallelized into a first parallelized cluster (S11) 610 and a second parallelized cluster (S12) 612. In this configuration, the first parallelized cluster 610 and a second parallelized cluster 612 are part of the first serialized layer 606. Still, because the output of the neurons of the first parallelized cluster 610 is independent from the output of the neurons in the second parallelized cluster 612, the neurons of the first serialized layer 606 may be parallelized to the aforementioned parallelized clusters. The first parallelized cluster 610 and the second parallelized cluster 612 may be referred to as a parallelized block P1) 614.

The serialized layers and parallelized clusters may be referred to as sub-systems. In one configuration, once the sub-systems of the neural network have been determined, the parameters of the neural network are pruned. That is, the parameters of each sub-system are analyzed to determine if the parameters affect the output of the sub-system. If a parameter does not affect a sub-system, the parameter may be pruned for purposes of evaluating the respective sub-system as that parameter's value does not alter the eventual output of the respective sub-system.

Figure 6D:
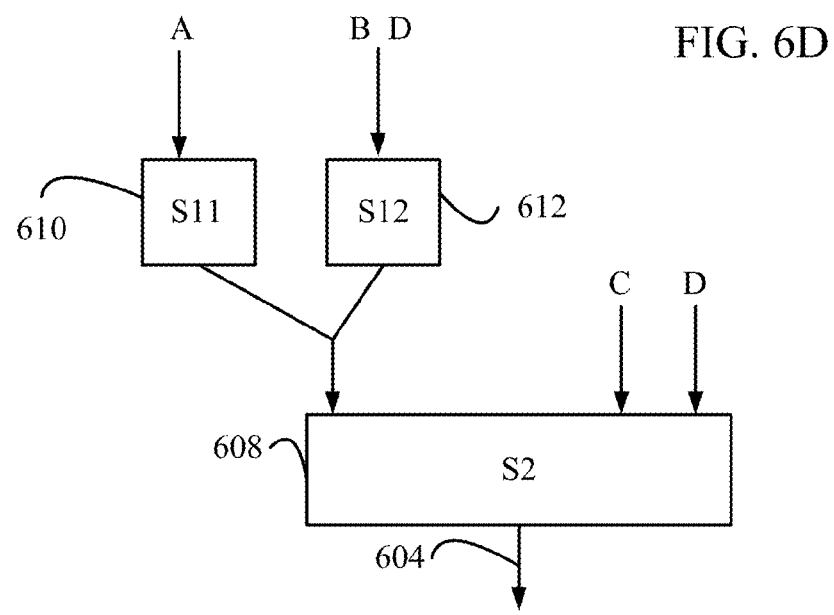

As shown in FIG. 6D, the inputs to the first parallelized cluster 610, second parallelized cluster 612, and second serialized layer 608 (e.g., the sub-systems) are pruned. In this example, the system may determine that parameter A only affects the first parallelized cluster 610, parameters B and D only affect the second parallelized cluster 612, and parameters C and D only affect the second serialized layer 608. Thus, the parameters not affecting a specific sub-system are pruned and removed as inputs to the respective sub-system.

In one configuration, the identification of layers may be recursively performed. That is, each serialized layer may be treated as a serialized input layer to determine other serialized layers. Specifically, as previously discussed, the first layer refers to a group of interconnected neurons that have no internal inputs. The first layer also outputs to another group of interconnected neurons (e.g., second layer of interconnected neurons). That is, the first layer of neurons is not affected by the outputs of any of the other neurons in the network. Moreover, the first layer of neurons may receive inputs from outside of the neural network.

For example, a user may input image files that are transduced to a neural spiking representation to the first layer. After identifying the first layer of neurons, the second layer of neurons that receive inputs from neurons in the first layer are identified. The second layer of neurons only receives inputs from the first layer of neurons. That is, the inputs of the first layer of neurons are treated as external inputs. Thus, the search for the different layer of neurons is recursively performed based on the layers that only receive inputs from previous layers and have no other internal inputs.

The present disclosure is not limited to both serializing layers and parallelizing layers. In one configuration, the neural network is only serialized and pruned. Alternatively, in another configuration, the neural network is only parallelized and pruned. In another configuration, the user may identify the sub-systems. In still yet another configuration, the identification of the sub-systems may be identified by the compiler when the neural network is compiled.

As described above, the sub-system may be defined based on network connectivity. Additionally or alternatively, in one configuration, the sub-system may be defined by monitoring activity levels of a sweep. That is, when a first layer sub-system receives an input from a second layer sub-system, the first layer sub-system computes its outputs over all the stored outputs of the lower layer. If some of the outputs of the first layer (e.g., inputs to the second layer) are similar to each other (e.g. no spiking output for specific parameter ranges) then the system may run the computation once for all degenerate inputs. Moreover, the output of the second layer for one run may be stored as the output of the combined run for the entire range that produced the degenerate output from the first layer.

Furthermore, in one configuration, after each step in a sweep, an output of each sub-system is stored. That is, the parameter sweep may to produce a large collection of outputs of the combined system. Accordingly, the user may desire to analyze the outputs according to a function that is defined on the outputs of the combined network. For example, the user may desire to analyze whether neurons respond selectively to a pattern of spiking outputs of individual neurons in the final serialized layer.

Figure 7:
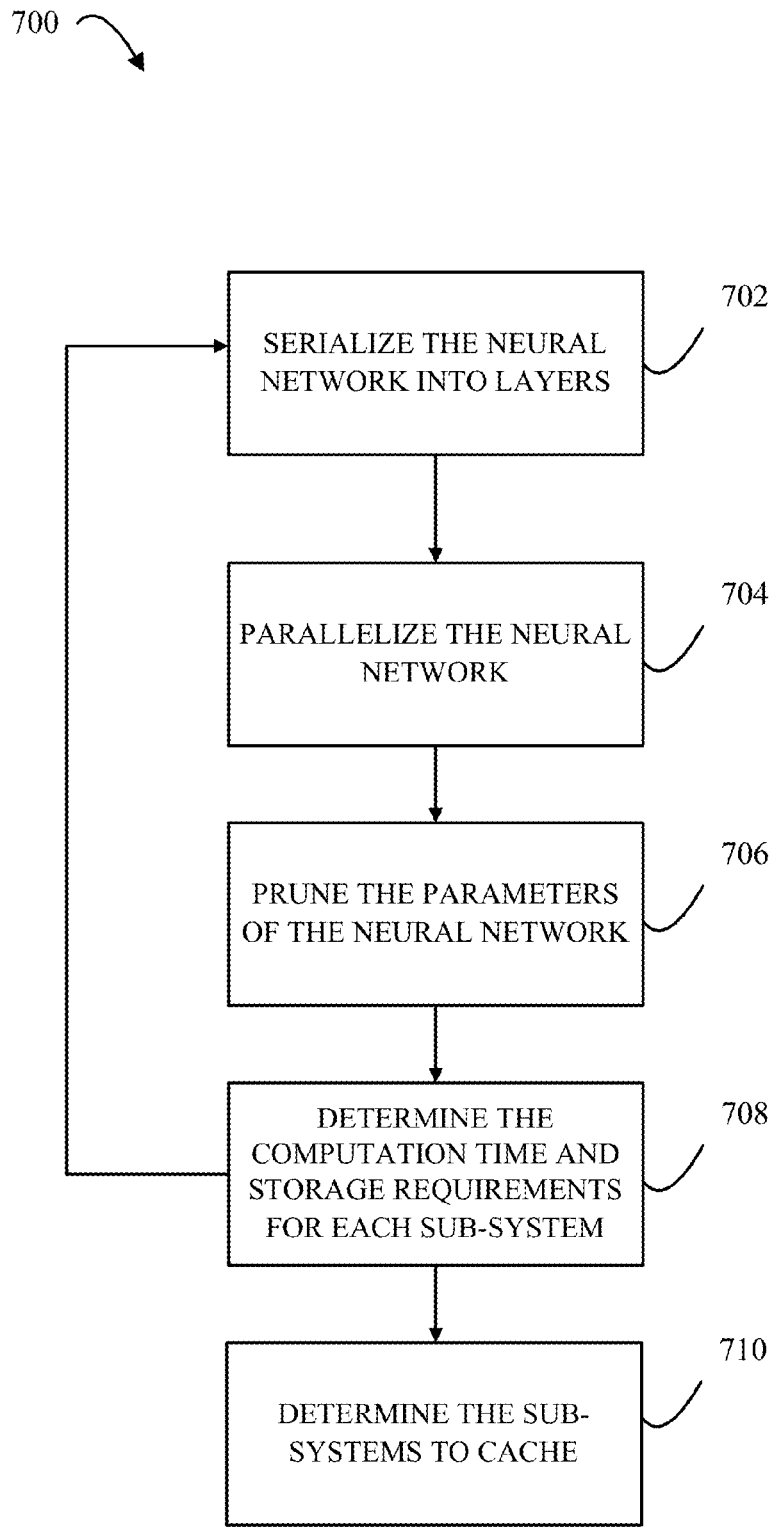
FIG. 7 is a block diagram illustrating a method for improving a parameter evaluation of a neural network according to an aspect of the present disclosure.

FIG. 7 illustrates a method 700 for improving a parameter evaluation of a neural network according to an aspect of the present disclosure. At block 702, the method serializes the neural network into layers. In one configuration, the serialization determines a first layer (e.g., input layer) that receives an input of the parameters but has no other internal inputs. Additionally, in this configuration, the serialization of block 702 also determines a second layer that receives an input from the first layer. After serializing a layer, the serialized layer is parallelized at block 704. In one configuration, the parallelization uses reciprocal connections to determine clusters of neurons within the serialized layer. Each cluster of neurons within the serialized layer may be referred to as a parallelized cluster.

In block 706, the parameters of the neural network are pruned. The pruning refers to removing parameters that are not used by a specific parallelized cluster and/or serialized layer. As previously discussed the parallelized clusters and serialized layers of a neural network may be referred to as sub-systems, restricted sets, or components. In block 708, the computation time (Te) and storage requirements (S, Ta) for each sub-system are determined. In one configuration, after determining the computation time (Te) and storage requirements (S, Ta) for each sub-system at block 708, blocks 702-706 may be performed recursively to determine additional sets (parallelized and/or serialized). In another configuration, at block 710, an objective function determines the sub-systems to cache based on access time, memory access time, and/or computational time.

Figure 8:
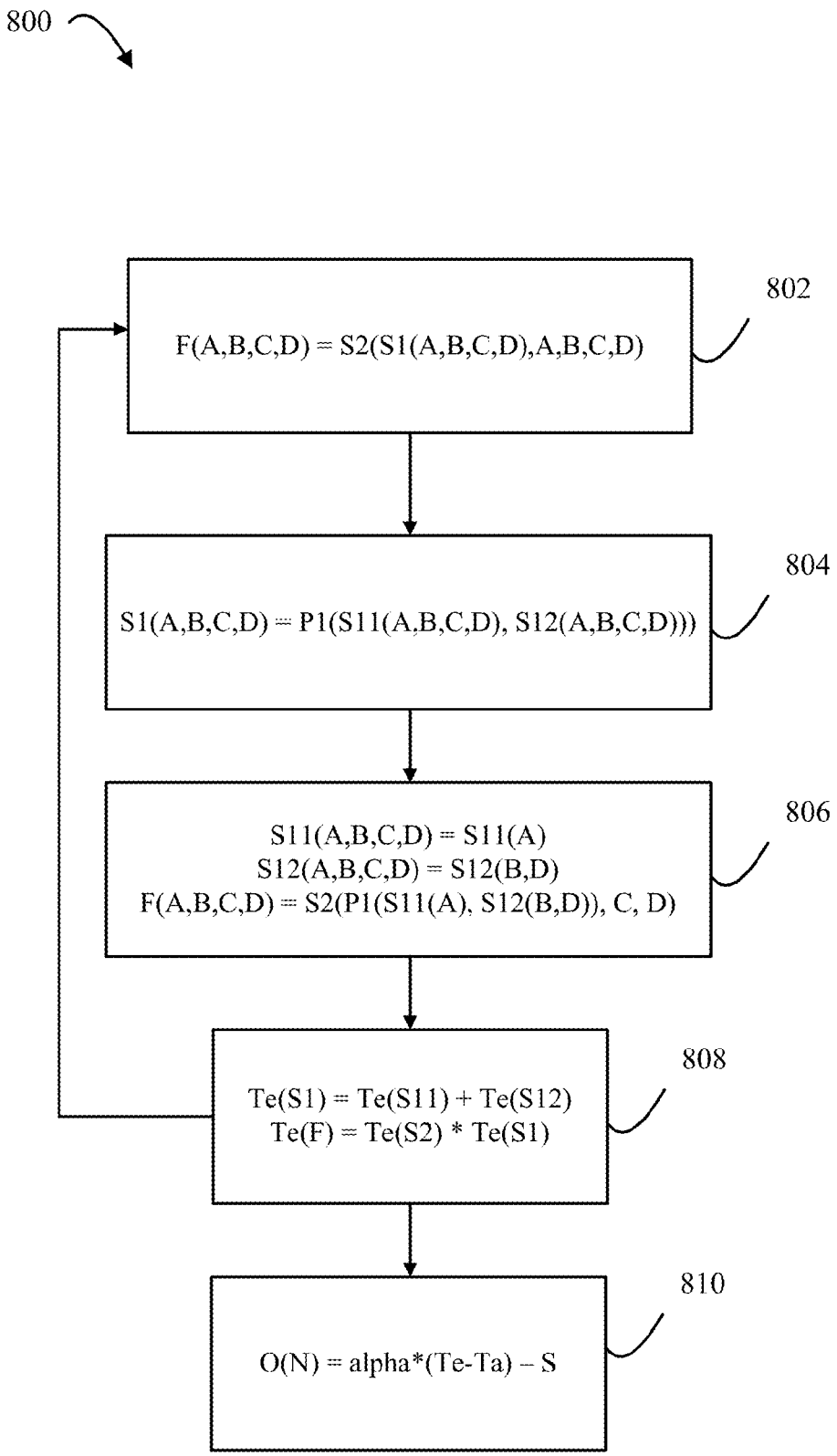
FIG. 8 is a block diagram illustrating functions for improving a parameter evaluation of a neural network according to an aspect of the present disclosure.

FIG. 8 illustrates functions for evaluating the parameters based on an aspect of the present disclosure. The flow chart of FIG. 8 is based on the block diagrams of FIGS. 6A-D. As shown in block 802, the parameters (A, B, C, and D) of a neural network may be evaluated based on a function F(A,B,C,D), where F is the function to evaluate the parameters. The output of the first serialized layer (S1) 606 is a function of its inputs, parameters A, B, C, and D and may thus be expressed as S1(A,B,C,D). The output of the second serialized layer 608 may also be expressed as a function of its inputs. As the inputs to the second serialized layer are parameters A, B, C, and D, in addition to the output from the first serialized layer 606, the output of the second serialized layer may be expressed as S2(S1(A,B,C,D), A,B,C,D). As shown in block 802, because the second serialized layer 608 is the final layer of the system, the function F(A,B,C,D) is equal to the output of the second serialized layer 608. Therefore, the output of the system function F(A,B,C,D) may be said to be equal to S2(S1(A,B,C,D), A,B,C,D).

At block 804, the function for the first serialized layer 606 is determined. That is, the first serialized layer 606 has a function of S1(A,B,C,D) which is equal to functions of a parallelized block 614 (P1). The parallelized block 614 includes the first parallelized cluster 610 (S11) and the second parallelized cluster 612 (S12). As shown in FIGS. 6A-D, the first parallelized cluster 610 and the second parallelized cluster 612 each have inputs of the parameters A, B, C, and D. Therefore, the first serialized layer 606 may be equal to a function P1 (S11(A,B,C,D), S12(A,B,C,D)).

At block 806, pruning is performed to improve the evaluation of the parameters. The first parallelized cluster (S11) 610 may be pruned to only be a function of parameter A, therefore, the first parallelized cluster 610 is equal to S11 (A). Additionally, the second parallelized cluster (S12) 612 may be pruned to only be a function of parameters B and D. Therefore, the second parallelized cluster 612 is equal to S12(B,D). Additionally, the second serialized layer 608 is pruned so that the inputs are only parameters C and D.

After pruning, the function for the first parallelized block 620 is P1 ((S11(A), S12(B,D)). Likewise, the function for the second serialized layer is S2 (P1(S11(A), S12(B,D)),C, D). After pruning, at block 808 the evaluation times (Te) for the layers and the neural network are determined. That is, the evaluation time for the first serialized layer 606 (S1) is the sum of the evaluation of the first parallelized cluster 610 and the second parallelized cluster 612 (S12). Furthermore, the neural network (F) is the product of the evaluation time for the first serialized layer 606 (S1) and the second serialized layer 608 (S2).

In one configuration, at block 810 an optimization function is executed to determine the sub-systems to cache based on the access time, memory access time, and/or computational time. The optimization function can be based on the following equation:

$$O(N) = \text{alpha} * (Te - Ta) - S \tag{15}$$

In equation (15), O is the optimization function and N is the identified sub-systems, such as a first serialized layer 606. Te is an evaluation time for input parameters. Ta is an evaluation time for parameters access from memory.

In equation (15) S is a measure of an amount of memory storage specified for each subsystem. For each sub-system, Te is the execution time of that subsystem. The execution time includes accessing the inputs of the subsystem in addition to generating and storing the outputs. Ta is the time to access the outputs of the system if they were stored in memory rather than recomputed from their inputs. If memory space is not a concern, the system may still compute memory access times to determine whether the system should cache the outputs from a particular subsystem.

In one configuration, the pruning may be performed to improve the computation along different dimensions because there may be different costs associated with computation time or memory storage. For example, a user may select to re-compute the outputs of a sub-system rather than store the outputs if the user is allocated more computing power and less memory storage. In this example, the trade-off between computation power and memory storage may be set as "alpha" in equation (15). In another configuration, the system determines to cache the outputs of subsystems for which the time to access the outputs Ta is less than the time to re-compute the outputs Te. In this configuration, the default settings in equation (15) are alpha is equal to 1 and S is equal to 0.

Figure 9:
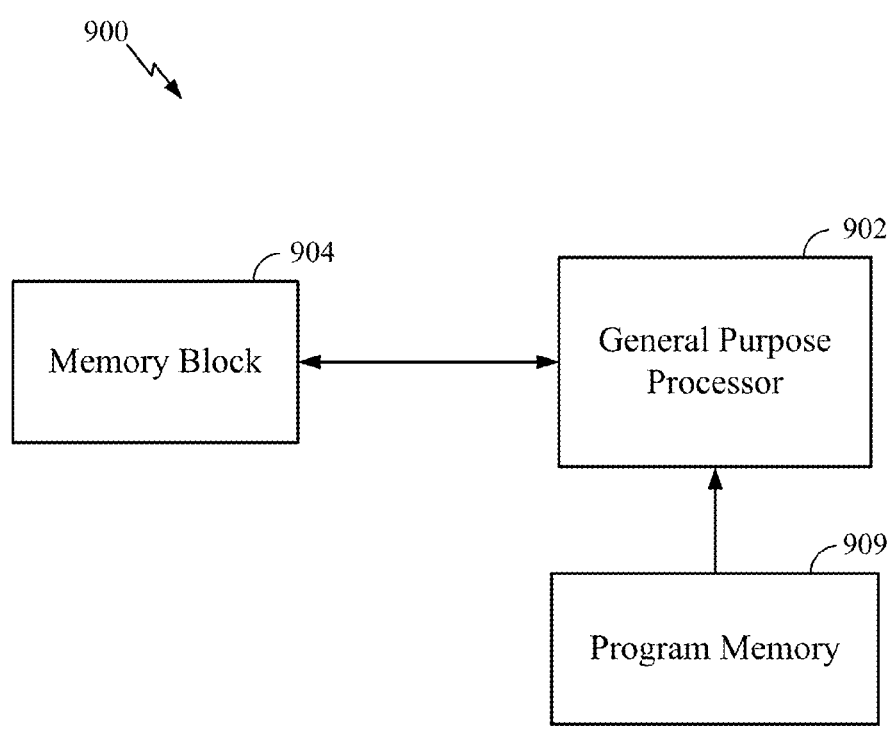
FIG. 9 illustrates an example implementation of designing a neural network using a general-purpose processor in accordance with certain aspects of the present disclosure.

FIG. 9 illustrates an example implementation 900 of the aforementioned modifying neural dynamics using a general-purpose processor 902 in accordance with certain aspects of the present disclosure. Variables (neural signals), synaptic weights, system parameters associated with a computational network (neural network), delays, and/or frequency bin information may be stored in a memory block 904, while instructions executed at the general-purpose processor 902 may be loaded from a program memory 909. In an aspect of the present disclosure, the instructions loaded into the general-purpose processor 902 may comprise code for obtaining prototypical neuron dynamics and/or modifying parameters of a neuron model so that the neuron model matches the prototypical neuron dynamics.

Figure 10:
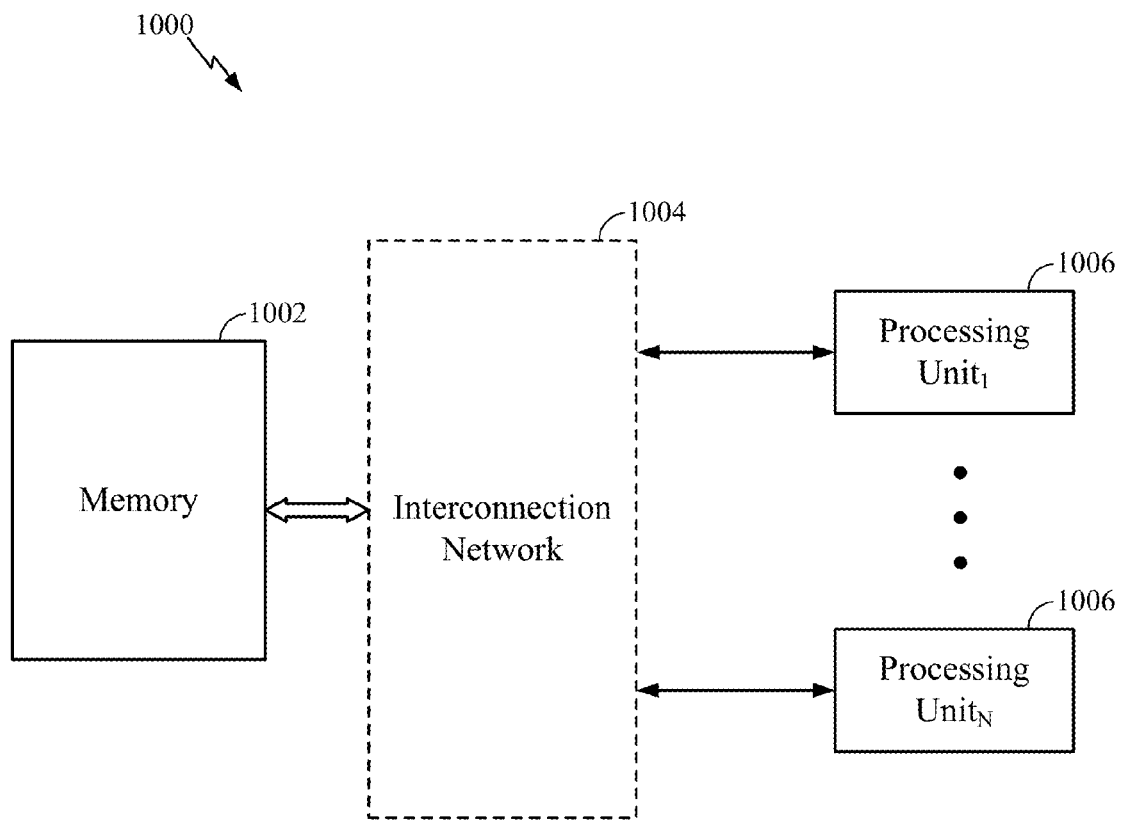
FIG. 10 illustrates an example implementation of designing a neural network where a memory may be interfaced with individual distributed processing units in accordance with certain aspects of the present disclosure.

FIG. 10 illustrates an example implementation 1000 of the aforementioned modifying neural dynamics where a memory 1002 can be interfaced via an interconnection network 1004 with individual (distributed) processing units (neural processors) 1006 of a computational network (neural network) in accordance with certain aspects of the present disclosure. Variables (neural signals), synaptic weights, system parameters associated with the computational network (neural network) delays, and/or frequency bin information may be stored in the memory 1002, and may be loaded from the memory 1002 via connection(s) of the interconnection network 1004 into each processing unit (neural processor) 1006. In an aspect of the present disclosure, the processing unit 1006 may be configured to obtain prototypical neuron dynamics and/or modify parameters of a neuron model.

Figure 11:
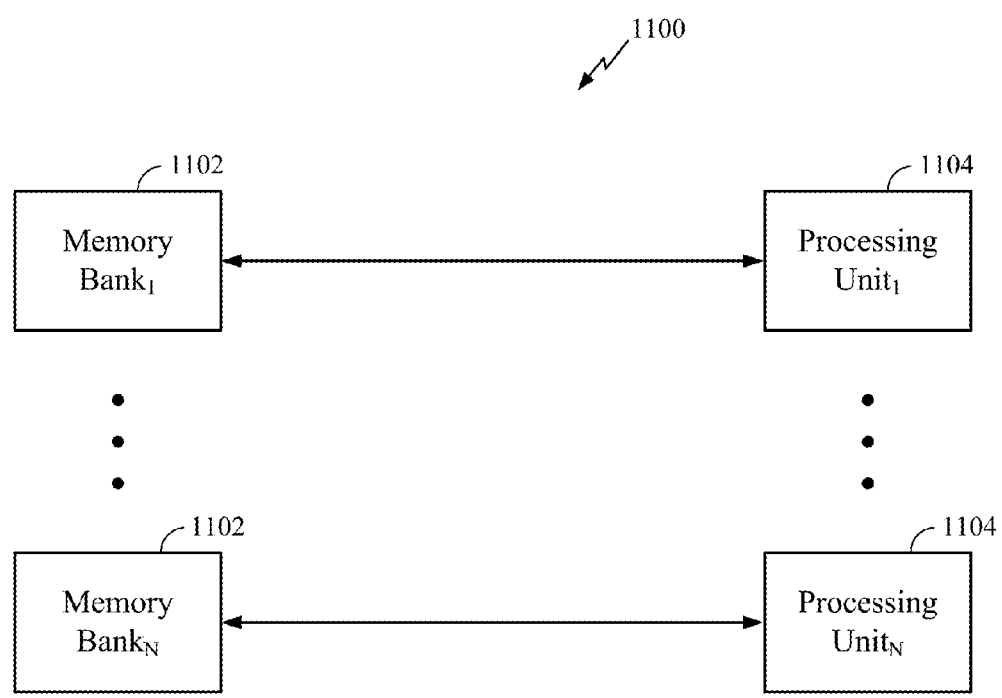
FIG. 11 illustrates an example implementation of designing a neural network based on distributed memories and distributed processing units in accordance with certain aspects of the present disclosure.

FIG. 11 illustrates an example implementation 1100 of the aforementioned modifying neural dynamics. As illustrated in FIG. 11, one memory bank 1102 may be directly interfaced with one processing unit 1104 of a computational network (neural network). Each memory bank 1102 may store variables (neural signals), synaptic weights, and/or system parameters associated with a corresponding processing unit (neural processor) 1104 delays, and frequency bin information. In an aspect of the present disclosure, the processing unit 1104 may be configured to obtain prototypical neuron dynamics and/or modify parameters of a neuron model.

Figure 12:
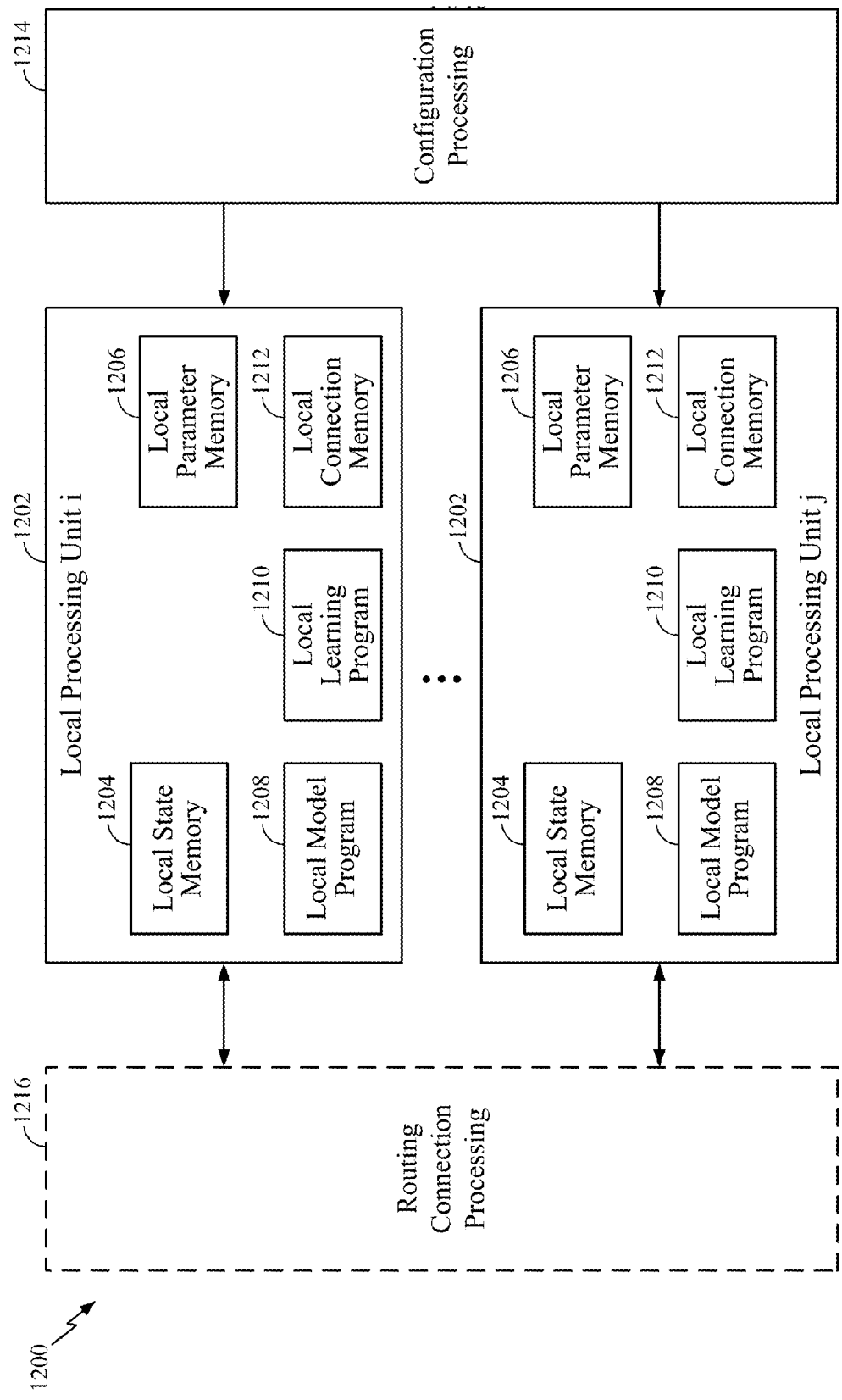
FIG. 12 illustrates an example implementation of a neural network in accordance with certain aspects of the present disclosure.

FIG. 12 illustrates an example implementation of a neural network 1200 in accordance with certain aspects of the present disclosure. As illustrated in FIG. 12, the neural network 1200 may have multiple local processing units 1202 that may perform various operations of the methods described above. Each processing unit 1202 may be a local state memory 1204 and a local parameter memory 1206 that store states and parameters of the neural network. In addition, the processing unit 1202 may have a memory 1208 that stores a local (neuron) model program, a memory 1210 that stores a local learning program, and a local connection memory 1212. Furthermore, as illustrated in FIG. 12, each local processing unit 1202 may be interfaced with a unit 1214 for configuration processing that may provide configuration for local memories of the local processing unit, and with routing connection processing elements 1216 that provide routing between the local processing units 1202.

According to certain aspects of the present disclosure, each local processing unit 1202 may be configured to determine parameters of the neural network based upon desired one or more functional features of the neural network. Each local processing unit may develop the one or more functional features towards the desired functional features as the determined parameters are further adapted, tuned, and updated.

Figure 13:
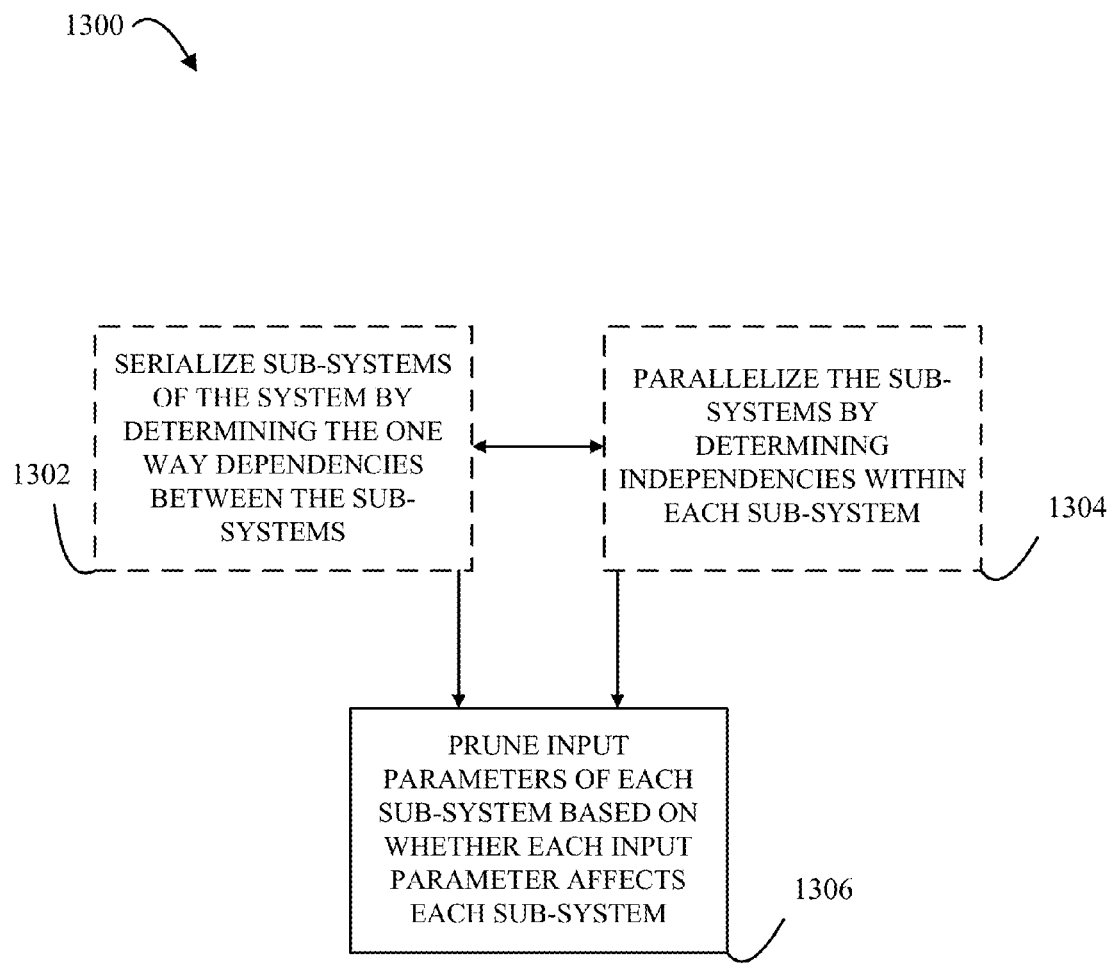
FIG. 13 is a block diagram illustrating a method for performing a parameter sweep over a system having sub-systems with one-way dependencies

FIG. 13 illustrates a method 1300 for performing a parameter sweep over a system having sub-systems with one-way dependencies. In one configuration, at block 1302 the neuron model serializes sub-systems of the system by determining the one way dependencies between the sub-systems. Furthermore, in addition to or alternate from the serializing of block 1302, at block 1304, the neuron model parallelizes the sub-systems by determining independencies within each sub-system. That is, in one configuration, the neuron model may either perform the serializing of block 1302 or the parallelizing of block 1304. In another configuration, the neuron model may perform both the serializing of block 1302 and the parallelizing of block 1304. Finally, at block 1306, the neuron model prunes input parameters of each sub-system based on whether each input parameter affects each sub-system.

In one configuration, a neural network, such as the neural network of the aspects of the present disclosure, is configured to modify neural dynamics. The neural network may include means for parallelizing, means for serializing, and/or means for pruning. In one aspect, the parallelizing means, serializing means, and/or pruning means may be the program memory 906, memory block 1204, memory 1002, interconnection network 1004, processing units 1006, processing unit 1104, local processing units 1202, and or the routing connection processing elements 916 configured to perform the functions recited by the parallelizing means, serializing means, and/or pruning means The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of performing a parameter sweep over a neural network, comprising:
   serializing the neural network into a first group of interconnected neurons and a second group of interconnected neurons by determining a one-way dependency between an input of the first group of interconnected neurons and an output of the second group of interconnected neurons, the one way dependency determined based on the input of the first group of interconnected neurons being different from the output of the second group of interconnected neurons;
   pruning a first input parameter of the first group of interconnected neurons based on whether the first input parameter is used as a parameter for a function of the first group of interconnected neurons; and
   pruning a second input parameter of the second group of interconnected neurons based on whether the second input parameter is used as a parameter for a function of the second group of interconnected neurons.

2. The method of claim 1, in which the serializing and/or the pruning is dependent at least in part on memory storage requirements, memory access time and/or a computational time.

3. The method of claim 1, further comprising defining the first group of interconnected neurons and the second group of interconnected neurons based on: connectivity of the neural network and/or monitoring activity levels of the parameter sweep.

4. The method of claim 3, further comprising storing, for every step of the parameter sweep, an output of the first group of interconnected neurons and the output of the second group of interconnected neurons.

5. The method of claim 1, further comprising evaluating an output of the neural network to determine a desired set of parameter values.

6. The method of claim 1, further comprising parallelizing the first group of interconnected neurons and the second group of interconnected neurons of the neural network by determining independencies of the first group of interconnected neurons and the second group of interconnected neurons.

7. An apparatus for performing a parameter sweep over a neural network, comprising:
   a memory module; and
   at least one processor coupled to the memory module, the at least one processor being configured:
   to serialize the neural network into a first group of interconnected neurons and a second group of interconnected neurons by determining a one-way dependency between an input of the first group of interconnected neurons and an output of the second group of interconnected neurons, the one way dependency determined based on the input of the first group of interconnected neurons being different from the output of the second group of interconnected neurons;
   to prune a first input parameter of the first group of interconnected neurons based on whether the first input parameter is used as a parameter for a function of the first group of interconnected neurons; and
   to prune a second input parameter of the second group of interconnected neurons based on whether the second input parameter is used as a parameter for a function of the second group of interconnected neurons.

8. The apparatus of claim 7, in which the at least one processor is further configured to serialize and/or prune dependent at least in part on memory storage requirements, memory access time and/or a computational time.

9. The apparatus of claim 7, in which the at least one processor is further configured to define the first group of interconnected neurons and the second group of interconnected neurons based at least in part on connectivity of the neural network and/or monitoring activity levels of the parameter sweep.

10. The apparatus of claim 9, in which the at least one processor is further configured to store, for every step of the parameter sweep, an output of the first group of interconnected neurons and the output of the second group of interconnected neurons.

11. The apparatus of claim 7, in which the at least one processor is further configured to evaluate an output of the neural network to determine a desired set of parameter values.

12. The apparatus of claim 7, in which the at least one processor is further configured to parallelize the first group of interconnected neurons and the second group of interconnected neurons of the neural network by determining independencies of the first group of interconnected neurons and the second group of interconnected neurons.

13. An apparatus for performing a parameter sweep over a neural network, comprising:
   means for serializing the neural network into a first group of interconnected neurons and a second group of interconnected neurons by determining a one-way dependency between an input of the first group of interconnected neurons and an output of the second group of interconnected neurons, the one way dependency determined based on the input of the first group of interconnected neurons being different from the output of the second group of interconnected neurons;

means for pruning a first input parameter of the first group of interconnected neurons based on whether the first input parameter is used as a parameter for a function of the first group of interconnected neurons; and means for pruning a second input parameter of the second group of interconnected neurons based on whether the second input parameter is used as a parameter for a function of the second group of interconnected neurons.

14. The apparatus of claim 13, in which the means for serializing and/or the means for pruning are dependent at least in part on memory storage requirements, memory access time and/or a computational time.

15. The apparatus of claim 13, further comprising means for defining the first group of interconnected neurons and the second group of interconnected neurons based at least in part on connectivity of the neural network and/or monitoring activity levels of the parameter sweep.

16. The apparatus of claim 15, further comprising means for storing, for every step of the parameter sweep, an output of the first group of interconnected neurons and the output of the second group of interconnected neurons.

17. The apparatus of claim 13, further comprising means for evaluating an output of the neural network to determine a desired set of parameter values.

18. The apparatus of claim 13, further comprising means for parallelizing the first group of interconnected neurons and the second group of interconnected neurons of the neural network by determining independencies of the first group of interconnected neurons and the second group of interconnected neurons.

19. A non-transitory computer-readable medium having program code recorded thereon for performing a parameter sweep over a neural network, the program code comprising:

program code to serialize the neural network into a first group of interconnected neurons and a second group of interconnected neurons by determining a one-way dependency between an input of the first group of interconnected neurons and an output of the second group of interconnected neurons, the one way dependency determined based on the input of the first group of interconnected neurons being different from the output of the second group of interconnected neurons;

program code to prune a first input parameter of the first group of interconnected neurons based on whether the first input parameter is used as a parameter for a function of the first group of interconnected neurons; and program code to prune a second input parameter of the second group of interconnected neurons based on whether the second input parameter is used as a parameter for a function of the second group of interconnected neurons.

20. The non-transitory computer-readable medium of claim 19, in which the program code to serialize and/or the program code to prune is dependent at least in part on memory storage requirements, memory access time and/or a computational time.

21. The non-transitory computer-readable medium of claim 19, in which the program code further comprises program code to define the first group of interconnected neurons and the second group of interconnected neurons based at least in part on connectivity of the neural network and/or monitoring activity levels of the parameter sweep.

22. The non-transitory computer-readable medium of claim 21, in which the program code further comprises program code to store, for every step of the parameter sweep, an output of the first group of interconnected neurons and the output of the second group of interconnected neurons.

23. The non-transitory computer-readable medium of claim 19, in which the program code further comprises program code to evaluate an output of the neural network to determine a desired set of parameter values.

24. The non-transitory computer-readable medium of claim 19, in which the program code further comprises program code to parallelize the first group of interconnected neurons and the second group of interconnected neurons of the neural network by determining independencies of the first group of interconnected neurons and the second group of interconnected neurons.

* * * * *